United States Patent [19]

Takigawa

[11] Patent Number: 5,114,579
[45] Date of Patent: May 19, 1992

[54] SEPARATION OF METALS BY SUPPORTED LIQUID MEMBRANE

[75] Inventor: Doreen Y. Takigawa, Los Alamos, N. Mex.

[73] Assignee: The United States of America as represented by the United States Department of Energy, Washington, D.C.

[21] Appl. No.: 602,460

[22] Filed: Oct. 22, 1990

[51] Int. Cl.⁵ .................. B01D 15/04; B01D 17/00
[52] U.S. Cl. .................................. 210/638; 210/643; 210/644; 210/651; 210/653; 210/321.76
[58] Field of Search ........... 210/643, 641, 642, 500.33, 210/638, 321.76, 635, 500.28, 653, 651, 500.23, 681, 749, 500.27, 644, 637; 55/16, 68; 429/206; 428/398; 264/347

[56] References Cited

U.S. PATENT DOCUMENTS

| | | | |
|---|---|---|---|
| 3,352,422 | 1/1966 | Heden | 210/321.76 |
| 4,020,142 | 4/1977 | Davis | 264/347 |
| 4,268,395 | 5/1981 | Stewart | 210/749 |
| 4,448,687 | 5/1984 | Wang | 210/500.2 |
| 4,461,709 | 7/1984 | Batzer | 210/643 |
| 4,512,894 | 4/1985 | Wang | 210/500.2 |
| 4,592,973 | 6/1986 | Pemsler | 429/206 |
| 4,617,125 | 10/1986 | Danesi | 210/642 |
| 4,628,067 | 12/1986 | Chen et al. | 521/25 |
| 4,634,530 | 1/1987 | Kuder et al. | 210/500.23 |
| 4,661,257 | 4/1987 | Kreevoy et al. | 210/500.33 |
| 4,693,824 | 9/1987 | Sansone | 210/500.8 |
| 4,693,825 | 9/1987 | Trouw | 210/500.28 |
| 4,814,228 | 3/1989 | Onorato | 428/398 |
| 4,816,407 | 3/1989 | Matson | 210/641 |
| 4,828,699 | 5/1989 | Soehngen | 210/500.28 |
| 4,842,740 | 6/1989 | Chung et al. | 210/500.27 |
| 4,851,124 | 7/1989 | Vandegrift | 210/638 |

OTHER PUBLICATIONS

Danesi et al. in Journal of Membrane Science, 27, pp. 339-347 (1986), entitled "A Composite Supported Liquid Membrane for Ultraclean Co-Ni Separations".

P. A. O'Hara et al. in Journal of Membrane Science. 44, pp. 273-287 (1989), entitled "Supported Liquid Membranes for Copper Transport".

*Primary Examiner*—Robert A. Dawson
*Assistant Examiner*—Ana M. Fortuna
*Attorney, Agent, or Firm*—Bruce H. Cottrell; Paul D. Gaetjens; William R. Moser

[57] ABSTRACT

A supported liquid membrane system for the separation of a preselected chemical species within a feedstream, preferably an aqueous feedstream, includes a feed compartment containing a feed solution having at least one preselected chemical species therein, a stripping compartment containing a stripping solution therein, and a microporous polybenzimidazole membrane situated between the compartments, the microporous polybenzimidazole membrane containing an extractant mixture selective for the preselected chemical species within the membrane pores is disclosed along with a method of separating preselected chemical species from a feedstream with such a system, and a supported liquid membrane for use in such a system.

15 Claims, 3 Drawing Sheets

Formula I:

Formula II:

Formula III:

SEPARATION OF METALS BY SUPPORTED LIQUID MEMBRANE

This invention is the result of a contract with the Department of Energy (Contract No. W-7405-ENG-36).

FIELD OF THE INVENTION

The present invention relates to the field of supported liquid membranes and separation of, e.g., metals, from aqueous media by such membranes.

BACKGROUND OF THE INVENTION

Liquid membrane separation, which combines the steps of solvent extraction and stripping in a single process, is an area generating special interest because of its potential for low cost and energy savings. There are two types of liquid membrane systems: supported liquid membranes, immobilized on a porous polymeric membrane; and liquid surfactant membranes as a (water/oil)/water emulsion or a (oil/water)/oil emulsion.

Supported liquid membranes (SLM) generally consist of a solvent/carrier mixture which is contained within the pores of the polymeric solid, i.e., the membrane. Into this solvent/carrier impregnated membrane, a solute from a feed solution is selectively removed by combining with the carrier to form a complex. This complex diffuses through the membrane and is then stripped from the carrier at the other side of the membrane.

A supported liquid membrane is most typically used for the extraction of metal ions and consists of a solution of an organic solvent containing the carrier (an extractant), the solution being contained within the pores of a porous polymeric support or membrane. The membrane is interposed between two aqueous solutions, a feed solution containing the metal ions to be extracted and a stripping solution for recovering the extracted ions. By adjusting the pH or other chemical potential gradient between the feed solution and the stripping solution, a driving force is provided and the metal ions extracted from the feed solution are transported through the membrane and transferred into the stripping solution. Previously, one problem with SLM's has been that while selective extraction and effective transport can be accomplished, SLM's have had limited lifetimes as the extractant in the organic solution of the membrane is continuously lost into the aqueous phase. This continuous loss of extractant has naturally hampered the application of SLM's to industrial processes.

Accordingly, it is an object of this invention to provide a supported liquid membrane including a microporous polybenzimidazole membrane containing an extractant mixture within the membrane pores for use, e.g., to separate metal ions, e.g., aluminum, antimony, arsenic, bismuth, cadmium, chromium, copper, cobalt, gallium, gold, hafnium, indium, iridium, iron, lead, manganese, mercury, molybdenum, neodymium, nickel, niobium, osmium, palladium, platinum, rhenium, rhodium, ruthenium, selenium, silver, tantalum, tellurium, thallium, thorium, tin, tungsten, uranium, vanadium, zinc or zirconium, from an aqueous solution.

Another object of this invention is to provide a supported liquid membrane apparatus including a feed compartment, and a stripping compartment, said compartments separated by a microporous polybenzimidazole membrane containing an extractant mixture within the membrane pores.

Still another object of this invention is to provide a process of selectively removing metal ions from aqueous wastewater streams such as those that result from, e.g., hydrometallurgical operations.

SUMMARY OF THE INVENTION

To achieve the foregoing and other objects, and in accordance with the purposes of the present invention, as embodied and broadly described herein, the present invention provides a supported liquid membrane system for the separation of a preselected chemical species within a feedstream, preferably an aqueous feedstream, the system including a feed compartment containing therein a feed solution including at least one preselected chemical species, a stripping compartment containing a stripping solution therein, and a microporous polybenzimidazole membrane situated between the feed compartment and the stripping compartment, the microporous polybenzimidazole membrane containing an extractant mixture selective for the preselected chemical species within the membrane pores.

The present invention further provides a method of separating a preselected chemical species from a feedstream, preferably an aqueous feedstream, including providing a supported liquid membrane having both a first and a second side, said membrane comprised of microporous polybenzimidazole, said polybenzimidazole containing an extractant mixture selective for said preselected chemical species within the polybenzimidazole pores, contacting the feedstream containing said preselected chemical species with the first side of said supported liquid membrane in a feed compartment adjacent to said supported liquid membrane for a time sufficient to extract at least a portion of said preselected chemical species from the feedstream into the extractant mixture, and contacting a stripping solution with the second side of said supported liquid membrane in a stripping compartment adjacent to said supported liquid membrane, for a time sufficient to strip at least a portion of said preselected chemical species from the extractant mixture into the stripping solution.

The present invention can also be characterized as an improvement in a supported liquid membrane system for the separation of a preselected chemical species from a feedstream, preferably an aqueous feedstream, said system including a microporous polymer membrane situated between a feed compartment containing therein a feed solution including at least one preselected chemical species, and a stripping compartment containing a stripping solution therein, said microporous polymer membrane containing an extractant mixture selective for said preselected chemical species within the membrane pores, wherein the improvement comprises use of microporous polybenzimidazole as the microporous polymer membrane.

In one preferred embodiment, metals such as copper and neodymium can be stripped from aqueous solutions at far greater efficiencies and at far faster rates than is possible with presently available commercial membranes such as polypropylene or polycarbonate (e.g., Celgard 3401 or Celgard 2500 polypropylene or Nuclepore polycarbonate) by use of a supported liquid membrane comprised of a microporous polybenzimidazole membrane containing an extractant mixture within the membrane pores, the membrane including an acidic organophosphorus extractant stabilized as an oil-in-water emulsion by a surfactant.

DETAILED DESCRIPTION

Figure 1:
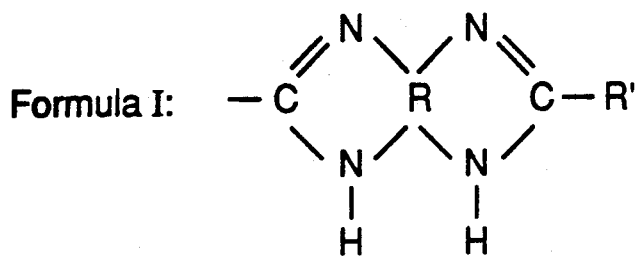
FIG. 1 depicts by chemical formulae several chemical structures used in the following description.
Figure 1:
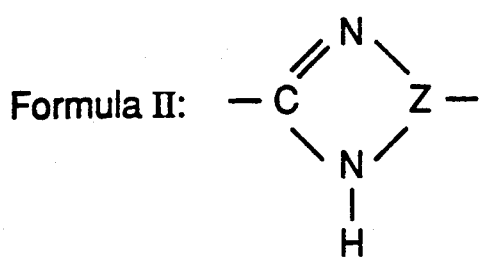
Figure 1:
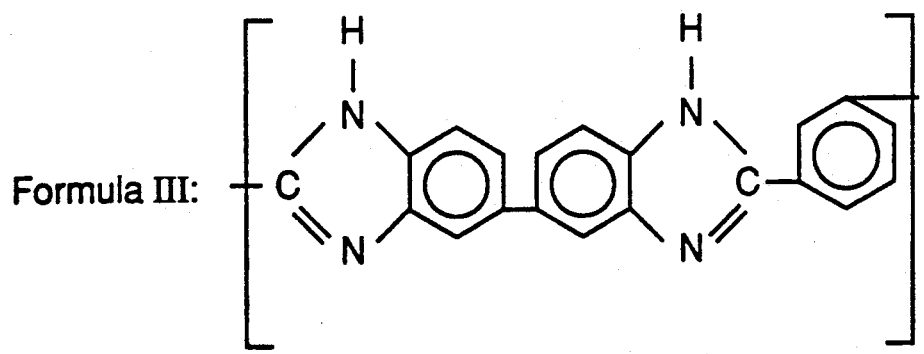

The present invention concerns supported liquid membrane technology which is an outgrowth of advances in two separate fields, i.e., liquid ion exchange reagents for the extraction of cations and anions, and microporous membranes for biological transport, battery separators and the like.

The present invention involves the discovery that use of microporous polybenzimidazole as the polymeric support in a supported liquid membrane can provide improved results over conventional polymeric supports such as polypropylene and polycarbonate in the separation of a chemical species, such as copper, neodymium and the like from aqueous solutions.

Polybenzimidazoles are a class of linear polymers whose repeat unit contains a benzimidazole moiety and are commonly known by the acronym PBI. The polybenzimidazoles useful in the supported liquid membranes of this invention may comprise any polybenzimidazole resin known to those skilled in the art. Typical polymers of this class and their preparation are more fully described in U.S. Pat. No. 2,895,948, U.S. Pat. No. Re. 26,065, and in the Journal of Polymer Science, Vol. 50, pages 511–539 (1961), which are herein incorporated by reference. The polybenzimidazoles consist essentially of recurring units of the Formulae I and II, shown in FIG. 1. In Formula I, R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkene group (preferably those having from 4 to 8 carbon atoms), and (3) a heterocyclic ring from the class consisting of (a) pyridine, (b) pyrazine, (c) furan, (d) quinoline, (e) thiophene, and (f) pyran.

In Formula II, Z is an aromatic nucleus having the nitrogen atoms forming the benzimidazole rings paired upon adjacent carbon atoms of the aromatic nucleus.

Preferably, aromatic polybenzimidazoles are selected, e.g., polymers consisting essentially of the recurring units of Formulae I and II, wherein R' is at least one aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the aromatic/aliphatic esters of an aromatic dicarboxylic acid, (b) the aromatic/aliphatic esters of an heterocyclic dicarboxylic acid wherein the carboxyl groups are substituents upon a carbon in the ring compound selected from the class consisting of pyridine, pyrazine, furan, quinoline, thiophene, and pyran, (c) an anhydride of an aromatic dicarboxylic acid, and (d) a free aromatic or aliphatic dicarboxylic acid.

Examples of polybenzimidazoles which have the recurring structure of Formula I include the following:
poly-2,2'-(meta-phenylene)-5,5'-bibenzimidazole; poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(meta-phenylene)-5,5'-diimidazobenzene;
poly-2,2'-cyclohexeneyl-5,5'-bibenzimidazole;
poly-2,2'-(meta-phenylene)-5,5'-di(benzimidazole) ether;
poly-2,2'-(meta-phenylene)-5,5'-di(benzimidazole) sulfide;
poly-2,2'-(meta-phenylene)-5,5'-di(benzimidazole) sulfone;
poly-2,2'-(meta-phenylene)-5,5'-di(benzimidazole) methane;
poly-2,2'-(meta-phenylene)-5,5'-di(benzimidazole) propane-2,2; and,
poly-2,2'-(meta-phenylene)-5,5'-di(benzimidazole) ethylene-1,2 where the double bonds of the ethylene groups are intact in the final polymer.

The preferred polybenzimidazole for use in the present invention is one prepared from poly[2,2'-(meta-phenylene)-5,5'-bibenzimidazole], the recurring unit of which is shown as Formula III in FIG. 1, available from Hoescht Celanese Corp.

Any polymerization process known to those skilled in the art may be employed to prepare the polybenzimidazole which may then be formed into a microporous membrane for use in the supported liquid membrane. Representative techniques for preparing the polybenzimidazole are disclosed in U.S. Pat. Nos. 3,509,108, 3,549,603, and 3,551,389, which are herein incorporated by reference.

With respect to aromatic polybenzimidazoles, preferably equimolar quantities of the monomeric tetraamine and dicarboxylic compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to about 0.3. The inherent viscosity (I.V.) as used herein is determined from a solution of 0.4 grams of the polymer in 100 milliliters of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.3, e.g., about 0.3 to about 0.5.

The temperature employed in the second stage is at least 250° C., preferably at least 325° C., and more preferably from about 350° C. to about 425° C. The second stage reaction generally takes at least 0.5 hour, and preferably 1 to 4 hours or more. It is, of course, also possible to prepare the instant polymers via a one-stage reaction. However, the previously-described two-stage process is preferred. The polybenzimidazole solution is allowed to cool to a temperature of about room temperature. Such a temperature is not crucial to the process.

The porous polybenzimidazole membrane used in the present invention can be prepared in a manner analogous to that described by Sansone in U.S. Pat. No. 4,693,824 and Trouw in U.S. Pat. No. 4,693,825 for the preparation of semipermeable membranes. In such a process of preparing the presently described porous membrane, a solution of polybenzimidazole in a suitable solvent is deposited and knifecasted as a film upon a support such as a glass surface, and subsequently the film (and support) are placed into a coagulation bath containing a non-solvent for the polybenzimidazole such as water and a solvent for the polybenzimidazole such as n-methylpyrrolidone or dimethylacetamide, to produce the desired porous membrane. The porous membranes of the present invention are generally from about 20 to about 120 microns in thickness, preferably from about 25 to about 100 microns in thickness.

The chemical species removable from a feedstream, more ususally an aqueous feedstream, by the present process can include charged materials such as metal ions selected from the group consisting of aluminum, arsenic, antimony, bismuth, cadmium, chromium, copper, cobalt, gallium, gold, hafnium, indium, iridium, iron, lead, manganese, mercury, molybdenum, neodymium, nickel, niobium, osmium, palladium, platinum, rhenium, rhodium, ruthenium, selenium, silver, tantalum, tellurium, thallium, thorium, tin, tungsten, uranium, vanadium, zinc or zirconium. The chemical species removable from a feedstream may also include neutral materials such as organic molecules, e.g., aromatic hydrocarbons, that may be separable from a hydrocarbon feedstream. Preferably, the chemical species is a metal ion.

An extractant mixture is contained within the porous polybenzimidazole membrane. The extractant mixture is selected on the ability to be selective for the particular chemical species to be removed from the aqueous feedstream. The extractant mixture can include a solvent, and a complexing agent or carrier selective for the particular chemical species. The solvent for the complexing agent is an essentially water-immiscible, liquid hydrocarbon solvent. These can include, e.g., aliphatic and aromatic hydrocarbons such as kerosenes, benzene, toluene, xylene, decane, and dodecane, decanol, and mixtures of such solvents. In some instances the solvent for the complexing agent may be water or a mixture of water and the above described liquid hydrocarbon solvents.

Suitable complexing agents for use in the extractant mixture can include acidic organophosphorus compounds such as diethylhexylphosphoric acid, monododecylphosphoric acid, octaphenylphosphoric acid or bis(trimethylpentyl)phosphinic acid, and organophosphorus acid esters such as trioctylphosphine oxide or tributyl phosphate, or may include macrocyclic polyethers such as crown ethers, e.g., LIX 84 which is 38% by weight of 2-hydroxy-5-nonylacetophenone oxime in kerosene available from Henkel Corp., secondary amines such as dodecylamine, tertiary amines such as tridecylamine, tri-n-octylamine or triphenylamine, carboxylic acids such as naphthenic acids, alkylated cupferrons such as the ammonium salt of N-(alkylphenyl)-N-nitrosohydroxylamine, beta-hydroxyoximes, beta-diketones, and alkylated ammonium salts such as tridodecylammonium chloride. Complexing agents such as dithizone may be used in separating metal ions such as cadmium, copper, lead, mercury, or zinc, while complexing agents such as thioxine may be used in separating metal ions such as antimony, arsenic, bismuth, cadmium, copper, cobalt, gallium, gold, indium, iridium, iron, lead, manganese, mercury, molybdenum, nickel, osmium, palladium, platinum, rhenium, rhodium, ruthenium, selenium, silver, tantalum, tellurium, thallium, tin, tungsten, vanadium, or zinc.

In the processes of the present invention, the extractant mixture will preferably contain from about from about 2 to about 70 percent by weight of the complexing agent, more preferably from about 10 to about 25 percent by weight of the complexing agent. For practical purposes, the cell operation is conducted at ambient temperatures and pressures although higher or lower temperatures and/or pressures may be operable. Also, the feed and strip solutions are flowed through the cell at about equal volumes, although the flow rates may be varied.

The preferred complexing agents will depend upon the preselected chemical species. For example, for copper and neodymium ions, the preferred complexing agents include the acidic organophosphorus compounds such as diethylhexylphosphoric acid.

A surfactant can be included in the extractant mixture with the solvent and the complexing agent. Suitable surfactants may assist in stabilizing the mixtures, i.e., reducing any tendency for the mixture to separate. The suitable surfactants are generally non-ionic surfactants with HLB numbers from about 8 to about 15, preferably from about 9 to about 10. Among suitable surfactants can be included polyoxyalkylene alkyl ethers, e.g., polyoxyethylene lauryl ether, polyoxyalkylene alkyl phenols, polyoxyalkylene esters, polyoxyalkylene sorbitan esters, polyoxyalkylene sorbitol esters, sorbitan esters, and polyols. Such surfactants can generally be added in amounts of about 1 to about 40 percent by weight based on the total amount of complexing agent, solvent and surfactant.

Where it is desired to separate a neutral species such as an organic molecule, e.g., an aromatic hydrocarbon from a hydrocarbon feedstream, the extractant for such an aromatic hydrocarbon may be, e.g., polyethylene glycol.

The pH of an aqueous feedstream containing the chemical species to be separated can be varied depending upon the choice of complexing agent. With complexing agents such as, e.g., acidic organophosphorus compounds, organophosphorus acid esters, or beta-hydroxyoximes, the pH of the feedstream is generally within the range of about 3.0 to about 6.0, more preferably from about 4.0 to about 5.5. The pH of the stripping solution is generally within the range of about 0.1 to about 2.0, more preferably from about 0.5 to about 1.0. The stripping solution can be an aqueous acidic solution, e.g., a nitric acid solution or other suitable acidic solution such as sulfuric acid. Some applications for metal transport may require extraction from basic solution and complexing agents such as beta-diketones can be used with pH ranges greater than about 8.

The porous polybenzimidazole membrane can be impregnated with the extractant mixture by immersing the membrane in the extractant mixture within a vacuum chamber and evacuating the chamber to draw the mixture into the pores of the membrane.

In the present process, a feed solution containing the metal ions to be extracted is placed in contact with one side of the supported liquid membrane. Preferably, the feed solution is passed through channels or grooves adjacent to the polymer surface. The other side of the supported liquid membrane is contacted with a stripping solution. Preferably, the stripping solution is passed through channels or grooves adjacent to the polymer surface and parallel to the grooves or channels through which the feed solution is passed. To achieve a high concentration of the extracted ions in the stripping solution, the driving force for transport is preferably maintained by continuous adjustment of, e.g., chemical concentration, and solution volumes.

Figure 2:
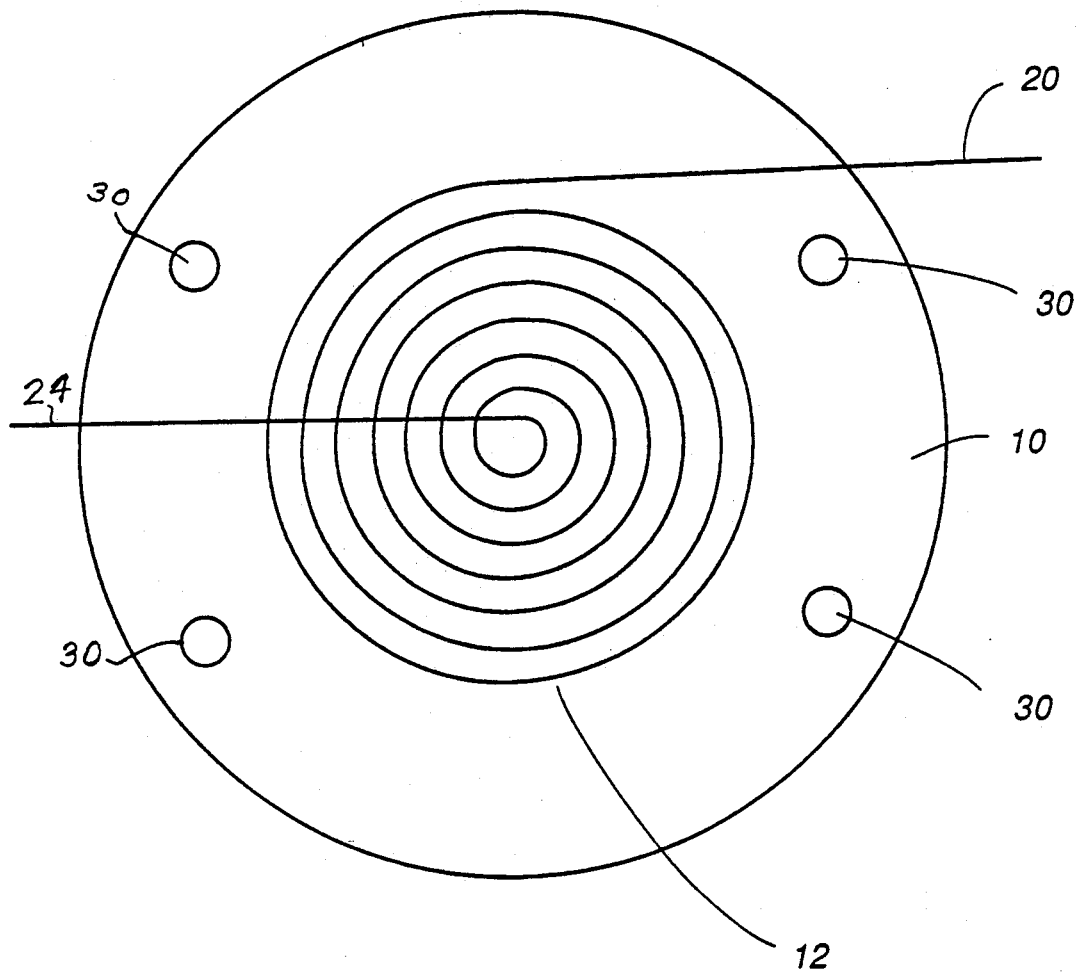
FIG. 2 shows an end view of the apparatus of the invention with the halfcells seen superimposed on one another.
Figure 3:
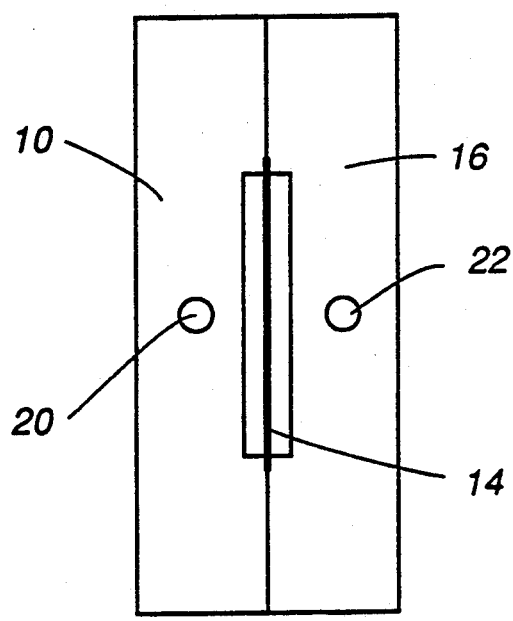
FIG. 3 shows a sideview of the apparatus of the invention with both halfcells shown from the side.

A common problem with supported liquid membranes has been loss of the extractant mixture from the pores of the particular membrane during operation. By use of the apparatus shown in FIG. 2, and further described in commonly owned and assigned co-pending application Ser. No. 601,973, by Takigawa et al., filed the same date herewith, the loss of extractant mixture has been found to be minimized. FIG. 2 shows a first faceplate 10 having spiral grooves 12 in one face of faceplate 10. Spiral grooves 12 are connected to inlet 20 and outlet 24. A second faceplate 16 having spiral grooves 18 connected to inlet 22 and outlet 26 in one face of faceplate 16 is a mirror image of first faceplate 10 and is blocked from view in FIG. 2 by superimposed faceplate 10. The two halfcells are securely held together by appropriate connectors through holes 30 which can be threaded. FIG. 3 includes a first faceplate 10 having spiral grooves 12 in one face of faceplate 10, porous polybenzimidazole membrane 14, and a second faceplate 16 having spiral grooves 18 in one face of faceplate 16. In operation of the process, spiral grooves 12 are aligned with spiral grooves 18. A feedstream, preferably an aqueous feedstream, containing a preselected chemical species is fed through inlet 20 into the volume of spiral grooves 12, such volume making up a system feed compartment. Extractant mixture is contained within the pores of the porous polybenzimidazole membrane. A stripping solution is passed through inlet 22 into the volume of spiral grooves 18, such volume making up a system stripping compartment.

For better performance and results of the process, the grooves in the respective faceplate are preferably from about 0.28 to about 0.35 cm in width, and from about 0.14 to about 0.18 cm in depth, more preferably from about 0.31 to about 0.33 cm in width, and from about 0.15 to about 0.17 cm in depth. While spiral grooves 12 and spiral grooves 18 are oppositely aligned, the feedstream and stripping solutions can be passed through the apparatus in either a countercurrent or concurrent arrangement.

The processes of the present invention involving the use of porous polybenzimidazole as the support membrane have been described specifically with reference to flat sheet-type membranes and the spiral grooved apparatus that can minimize loss of the liquid from the pores of the support membrane, but the process is equally applicable for use in hollow fiber-type geometries.

The present invention is more particularly described in the following examples which are intended as illustrative only, since numerous modifications and variations will be apparent to those skilled in the art.

EXAMPLE 1

A porous polybenzimidazole membrane was prepared as follows. A twenty-one percent by weight solution of polybenzimidazole in dimethylacetamide (35.7 grams (g)) was diluted with n-methyl pyrrolidone (39.3 g) to yield a ten percent by weight solution of polybenzimidazole. The solution was chilled in an icebath and a thin film of about 170 microns was cast onto a chilled glassplate with a chilled knife. The entire glassplate was placed into a coagulation bath comprised of 1760 milliliters (ml) of n-methyl pyrrolidone and 740 ml of water at about 7° C. After one hour, the glassplate was placed into a chilled water bath and left overnight. The resultant porous polybenzimidazole membrane was then cut to appropriate size to fit the cell.

An extractant mixture was prepared as follows. Into a flask was added 3 g of a polyoxyethylene lauryl ether surfactant (Brij 30, available from I.C.I. Americas, Inc.) in 87 g of water with vigorous stirring. To this mixture was added dropwise 10 g of 0.5 Molar (M) diethylhexylphosphoric acid in dodecane. This admixture was sonicated for about 3 hours to yield an oil-in-water emulsion.

A cut piece of the porous polybenzimidazole membrane was placed into a container with the extractant mixture. While the membrane was immersed in the solution, the container was placed into a vacuum chamber and evacuated overnight. The membrane was removed from the extractant mixture, rinsed with distilled water and placed into the cell apparatus. The cell apparatus was as shown in FIG. 2. The surface area of the membrane in the cell was about 4.5 square centimeters. The spiral grooves had dimensions of 98.5 cm in length, 0.16 cm in depth and 0.32 centimeters in width at the membrane surface.

The operation of the cell was as follows. The porous polybenzimidazole membrane containing the extractant mixture within its pores was kept wet at all times. A feed solution included 0.1M acetic acid, 1.9M sodium acetate, and $1 \times 10^{-3}$M of copper nitrate hydrate. The strip solution was 2M nitric acid. Into the feed chamber and strip chamber was placed 250 ml of each respective solution. The solutions were then circulated through the cell apparatus and the removal of the copper from the feed solution was followed over time by measuring the absorption at 560 nanometers using visible spectrophotometry with a Hach CuVer copper reagent. The results are shown in Table 1.

TABLE 1

| Elapsed Time (minutes) | Percentage of initial Cu remaining in feed solution |
|---|---|
| 0 | 100 |
| 20 | 65 |
| 41 | 57 |
| 63 | 31 |
| 81 | 21 |
| 100 | 13 |
| 174 | 3 |

EXAMPLE 2

For comparison with a typical commercial supported liquid membrane cell, the cell apparatus was fitted with a porous polypropylene membrane (Celgard 3401, available from Hoechst Celanese Corp.) loaded with the extractant mixture as in example 1 except that 0.75M diethylhexylphosphoric acid in dodecane was used rather than 0.5M. The cell apparatus was fitted with the Celgard membrane. A feed solution included 0.1M acetic acid, 1.9M sodium acetate, and $1 \times 10^{-3}$M of copper nitrate hydrate. The strip solution was 2M nitric acid. Into the feed chamber and strip chamber was placed 250 ml of each respective solution. The solutions were then circulated through the cell apparatus and the removal of the copper from the feed solution was followed over time by measuring the absorption at 560 nanometers. The results are shown in Table 2.

TABLE 2

| Elapsed Time (minutes) | Percentage of initial Cu remaining in feed solution |
| --- | --- |
| 0 | 100 |
| 108 | 79 |
| 199 | 65 |
| 285 | 59 |
| 401 | 57 |

EXAMPLE 3

A cell apparatus was fitted with a porous polybenzimidazole membrane containing the extractant mixture within its pores as in example 1. A feed solution included 0.1M acetic acid, 1.9M sodium acetate, and $1 \times 10^{-3}$M of neodymium nitrate hexahydrate. The strip solution was 2M nitric acid. Into the feed chamber and strip chamber was placed 250 ml of each respective solution. The solutions were then circulated through the cell apparatus and the removal of the neodymium from the feed solution was followed over time by measuring the absorption at 654 nanometers of 1 ml of the feed solution diluted to 50 ml volume with distilled water. The results are shown in Table 3.

TABLE 3

| Elapsed Time (minutes) | Percentage of initial Nd remaining in feed solution |
| --- | --- |
| 0 | 100 |
| 47 | 40 |
| 63 | 27 |
| 98 | 13 |
| 120 | 10 |
| 150 | 0 |

The results of the examples demonstrate the improved results achieved by the present process with the porous polybenzimidazole membrane in the present system, namely, the cell including the porous polybenzimidazole membrane containing the extractant mixture within its pores achieved almost complete removal of the target metal ions within about three hours whereas the cell including the porous polypropylene membrane containing the extractant mixture within its pores achieved less than 50 percent removal of the target metal ions after over six hours.

Although the present invention has been described with reference to specific details, it is not intended that such details should be regarded as limitations upon the scope of the invention, except as and to the extent that they are included in the accompanying claims.

What is claimed is:

1. A supported liquid membrane system for the separation of a preselected chemical species within a feedstream, said system comprising:
   a. a feed compartment containing a feed solution having at least one preselected chemical species therein, said preselected chemical species being a metal ion selected from the group consisting of aluminum, arsenic, antimony, bismuth, cadmium, chromium, copper, cobalt, gallium, gold, hafnium, indium, iridium, iron, lead, manganese, mercury, molybdenum, neodymium, nickel, niobium, osmium, palladium, platinum, rhenium, rhodium, ruthenium, selenium, silver, tantalum, tellurium, thallium, thorium, tin, tungsten, uranium, vanadium zinc, or zirconium;
   b. a stripping compartment containing a stripping solution therein; and,
   c. a microporous polybenzimidazole membrane situated between said feed compartment and said stripping compartment, said microporous polybenzimidazole membrane containing within the membrane pores an extractant mixture selective for said preselected chemical species.

2. The supported liquid membrane system of claim 1 wherein the preselected chemical species is a metal ion selected from the group consisting of copper and neodymium, and the extractant mixture includes an acidic organophosphorus compound and an organic solvent.

3. The supported liquid membrane system of claim 2 wherein the acidic organophosphorus extractant is diethylhexylphosphoric acid.

4. The supported liquid membrane system of claim 3 wherein the extractant mixture further includes a surfactant.

5. The supported liquid membrane system of claim 3 wherein the extractant mixture further includes polyoxyethylene lauryl ether.

6. A process of separating a preselected chemical species selected from the group consisting of aluminum, arsenic, antimony, bismuth, cadmium, chromium, copper, cobalt, gallium, gold, hafnium, indium, iridium, iron, lead, manganese, mercury, molybdenum, neodymium, nickel, niobium, osmium, palladium, platinum, rhenium, rhodium, ruthenium, selenium, silver, tantalum, tellurium, thallium, thorium, tin, tungsten, uranium, vanadium, zinc, or zirconium from a feedstream comprising:
   a. providing a supported liquid membrane having both a first and a second side, said membrane comprised of microporous polybenzimidazole, said polybenzimidazole containing within the polybenzimidazole pores an extractant mixture selective for said preselected chemical species;
   b. contacting a feedstream containing said preselected chemical species with the first side of said supported liquid membrane in a feed compartment adjacent to said supported liquid membrane for a time sufficient to extract at least a portion of said preselected chemical species from the feedstream into the extractant mixture; and,
   c. contacting a stripping solution with the second side of said supported liquid membrane in a stripping compartment adjacent to said supported liquid membrane, for a time sufficient to extract at least a portion of said preselected chemical species from the extractant mixture into the stripping solution.

7. The process of claim 6 wherein the preselected chemical species is a metal ion selected from the group consisting of copper and neodymium, and the extractant mixture includes an acidic organophosphorus compound and an organic solvent.

8. The process of claim 7 wherein the acidic organophosphorus extractant is diethylhexylphosphoric acid.

9. The process of claim 8 wherein the extractant mixture further includes a surfactant.

10. The process of claim 9 wherein the extractant mixture further includes polyoxyethylene lauryl ether.

11. In a supported liquid membrane system for the separation of a preselected chemical species selected from the group consisting of aluminum, arsenic, antimony, bismuth, cadmium, chromium, copper, cobalt, gallium, gold, hafnium, indium, iridium, iron, lead, manganese, mercury, molybdenum, neodymium, nickel, niobium, osmium, palladium, platinum, rhenium, rhodium, ruthenium, selenium, silver, tantalum, tellurium, thallium thorium, tin, tungsten, uranium vanadium, zinc, or zirconium from a feedstream, said system including a microporous polymer membrane situated between a feed compartment containing therein a feed solution including at least one preselected chemical species, and a stripping compartment containing a stripping solution therein, said microporous polymer membrane containing within the membrane pores on extractant mixture selective for said preselected chemical species, the improvement comprising use of microporous polybenzimidazole as the microporous polymer membrane.

12. In the supported liquid membrane system of claim 11 wherein the preselected chemical species is a metal ion selected from the group consisting of copper and neodymium, and the extractant mixture includes an acidic organophosphorus compound and an organic solvent.

13. In the supported liquid membrane system of claim 12 wherein the acidic organophosphorus extractant is diethylhexylphosphoric acid.

14. In the supported liquid membrane system of claim 13 wherein the extractant mixture further includes a surfactant.

15. In the supported liquid membrane system of claim 13, wherein the extractant mixture further includes polyoxyethylene lauryl ether.

* * * * *